Aug. 21, 1951     J. M. MOCHEL     2,564,708
HEAT SCREEN
Filed Sept. 3, 1947     3 Sheets-Sheet 3
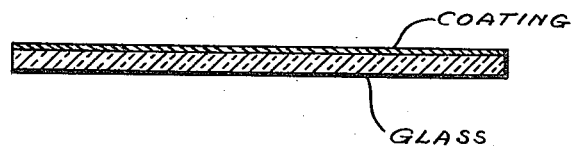
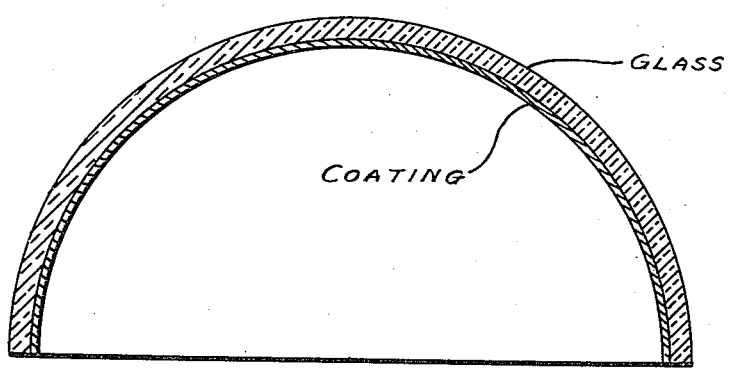
Inventor
JOHN M. MOCHEL
By F. H. Knight
Attorney Patented Aug. 21, 1951

2,564,708

UNITED STATES PATENT OFFICE 2,564,708

HEAT SCREEN

John M. Mochel, Corning, N. Y., assignor to Corning Glass Works, Corning, N. Y., a corporation of New York Application September 3, 1947, Serial No. 771,862

9 Claims. (Cl. 88—109)

This invention relates to filters, screens and the like, composed of glass or other transparent medium, for selectively transmitting, absorbing or reflecting heat rays or infrared radiations.

The primary object of the invention is to provide a heat screen for selectively reflecting and transmitting infrared radiations.

Another object is to provide a heat screen which will reflect low temperature radiations and transmit high temperature radiations.

Another object is to provide a heat screen which will reflect long infrared radiations and transmit short infrared radiations.

Another object is to provide a heat screen which will reflect infrared radiations in the neighborhood of 2 microns and longer and transmit shorter infrared and visible radiations.

I have discovered that thin films of certain metal oxides and oxide mixtures are relatively transparent to visible radiations and to infrared radiations up to about 2 microns in wave length but are substantially opaque to and will reflect longer infrared radiations. My invention, therefore, comprises a heat screen of glass having an adherent coating of such oxides.

Metal oxides which I have found to possess such characteristics are oxides of cadmium, indium, tin, and antimony. These metals have atomic weights ranging from about 112 to about 122 and are numbered from 48 to 51 respectively in the periodic system of elements. For the present purpose, they preferably are combined thus: tin oxide with antimony oxide, or tin oxide with indium oxide, or cadmium oxide with indium oxide. Tin oxide alone is also quite effective, and to a lesser extent also cadmium oxide alone and indium oxide alone, but antimony oxide alone is ineffective. The combination consisting of tin oxide and cadmium oxide is also ineffective. Best results are obtained with a combination comprising tin oxide and antimony oxide. Other oxides per se are generally ineffective for my purpose but they may be used in small amounts not exceeding about 20% in combination with a mixture of tin oxide and antimony oxide or a mixture of tin oxide and indium oxide.

The oxide films are deposited preferably on a glass support, such as a glass plate, by heating the glass uniformly to an elevated temperature, which may be about 500° C. or above, and atomizing a solution containing the desired metal salts as a fine mist upon the heated glass for a time sufficient to produce a coating of the desired thickness. Of the above named metals, those salts which can be hydrolyzed or decomposed in the presence of water, such as the chlorides, are used and these, on contact with the hot glass, form thin strongly adherent coatings of the corresponding oxides. Coatings most suitable for my purpose are from about 1000 to 7000 or more Angstroms in thickness and may be produced on borosilicate glass having a softening point of about 800° C. by heating the glass at about 700° C. and atomizing the salt solution on the hot glass for about 10 to 20 seconds.

The following salt solutions are examples of compositions which may be used to produce the oxide coatings of this invention, it being understood that the invention is not limited to the specific compositions set forth but includes all effective proportions of the salts of the above named metals within the scope of the claims.

*Salt solutions*

1. 100 g. $SnCl_4 \cdot 5H_2O$, 50 cc. $H_2O$, and 10 cc. concentrated aqueous hydrochloric acid; equivalent to 100% $SnO_2$.

2. 100 g. $SnCl_4 \cdot 5H_2O$, 1 g. $SbCl_3$, 50 cc. $H_2O$ and 10 cc. HCl; equivalent to 98.5% $SnO_2$ and 1.5% $Sb_2O_3$.

3. 100 g. $SnCl_4 \cdot 5H_2O$, 4 g. $SbCl_3$, 50 cc. $H_2O$ and 10 cc. HCl; equivalent to 94.5% $SnO_2$ and 5.5% $Sb_2O_3$.

4. 100 g. $SnCl_4 \cdot 5H_2O$, 1 g. $SbCl_3$, 8 g.

$MnCl_2 \cdot 4H_2O$ 50 cc. $H_2O$, and 10 cc. HCl, equivalent to 91.3% $SnO_2$, 1.3% $Sb_2O_3$ and 7.4% $MnO_2$.

5. 100 g. $SnCl_4 \cdot 5H_2O$, 1.5 g. $SbCl_3$, 1 g. $V_2O_5$, 50 cc. $H_2O$ and 10 cc. HCl, equivalent to 95.7% $SnO_2$, 2.1% $Sb_2O_3$ and 2.2% $V_2O_5$.

6. 100 g. $SnCl_4 \cdot 5H_2O$, 2 g. $SbCl_3$, 8 g.

$CoCl_2 \cdot 6H_2O$ 50 cc. $H_2O$, and 10 cc. HCl, equivalent to 91.4% $SnO_2$, 2.7% $Sb_2O_3$, and 5.9% $Co_2O_3$.

7. 100 g. $SnCl_4 \cdot 5H_2O$, 4 g. $SbCl_3$, 1 g. $ZnCl_2$, 50 cc. $H_2O$, and 10 cc. HCl, equivalent to 93.2% $SnO_2$, 5.5% $Sb_2O_3$, and 1.3% ZnO.

8. 100 g. $SnCl_4 \cdot 5H_2O$, 1 g. $SbCl_3$, 4 g. $CrCl_3$, 50 cc. $H_2O$ and 10 cc. HCl, equivalent to 94.4% $SnO_2$, 1.4% $Sb_2O_3$ and 4.2% $Cr_2O_3$.

9. 5.3 g. $InCl_3$, 8 cc. $H_2O$, 2 cc. HCl, equivalent to 100% $In_2O_3$.

10. 5.3 g. $InCl_3$, 0.14 g. $SnCl_4 \cdot 5H_2O$, 8 cc. $H_2O$ and 2 cc. HCl, equivalent to 98.2% $In_2O_3$ and 1.8% $SnO_2$.

11. 5.08 g. $InCl_3$, 0.28 g. $SnCl_4 \cdot 5H_2O$, 0.11 g. $CdCl_2 \cdot 2H_2O$, 8 cc. $H_2O$, and 2 cc. HCl, equivalent to 94.6% $In_2O_3$, 3.6% $SnO_2$, and 1.8% CdO.

12. 4.87 g. $InCl_3$, 0.56 g. $SnCl_4·5H_2O$, 0.11 g. $CuCl_2·2H_2O$, 8 cc. $H_2O$, and 2 cc. HCl, equivalent to 91.3% $In_2O_3$, 7.3% $SnO_2$ and 1.4% CuO.

13. 10 g. $Cd(NO_3)_2·4H_2O$, 0.4 g. $InCl_3$ and 10 cc. $H_2O$, equivalent to 94.6% CdO and 5.4% $In_2O_3$.

14. 10 g. $Cd(NO_3)_2·4H_2O$, 10 cc. $H_2O$, equivalent to 100% CdO.

The above compositions, when atomized on to hot glass in the manner described above, produce on the glass thin oxide coatings which are substantially transparent to visible light and to infrared radiations having wave lengths shorter than about 2 microns but reflect wave lengths longer than 2 microns.

For a better understanding of the invention reference is had to the accompanying drawings in which:

Fig. 3 is a sectional view of a window pane of glass having an oxide coating (greatly exaggerated in thickness), in accordance with the invention; and Fig. 4 is a vertical section of a "hot cap" composed of glass and having an interior oxide coating (greatly exaggerated) in accordance with the invention.

Figure 1:
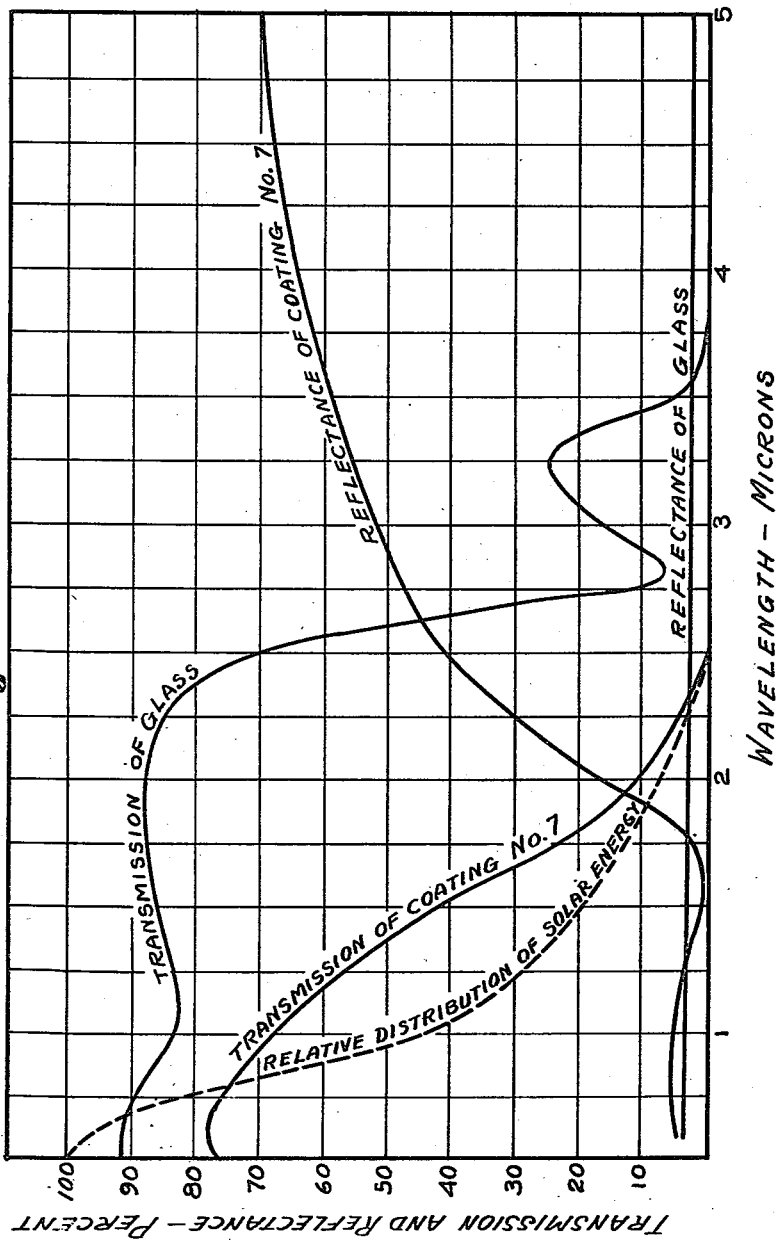
Fig. 1 is a graph showing the infrared transmission and reflectance of a coating deposited by composition No. 7 on a glass plate in accordance with the invention as compared to the infrared transmission and reflectance of the glass per se and the relative distribution of solar energy in the infrared.
Figure 2:
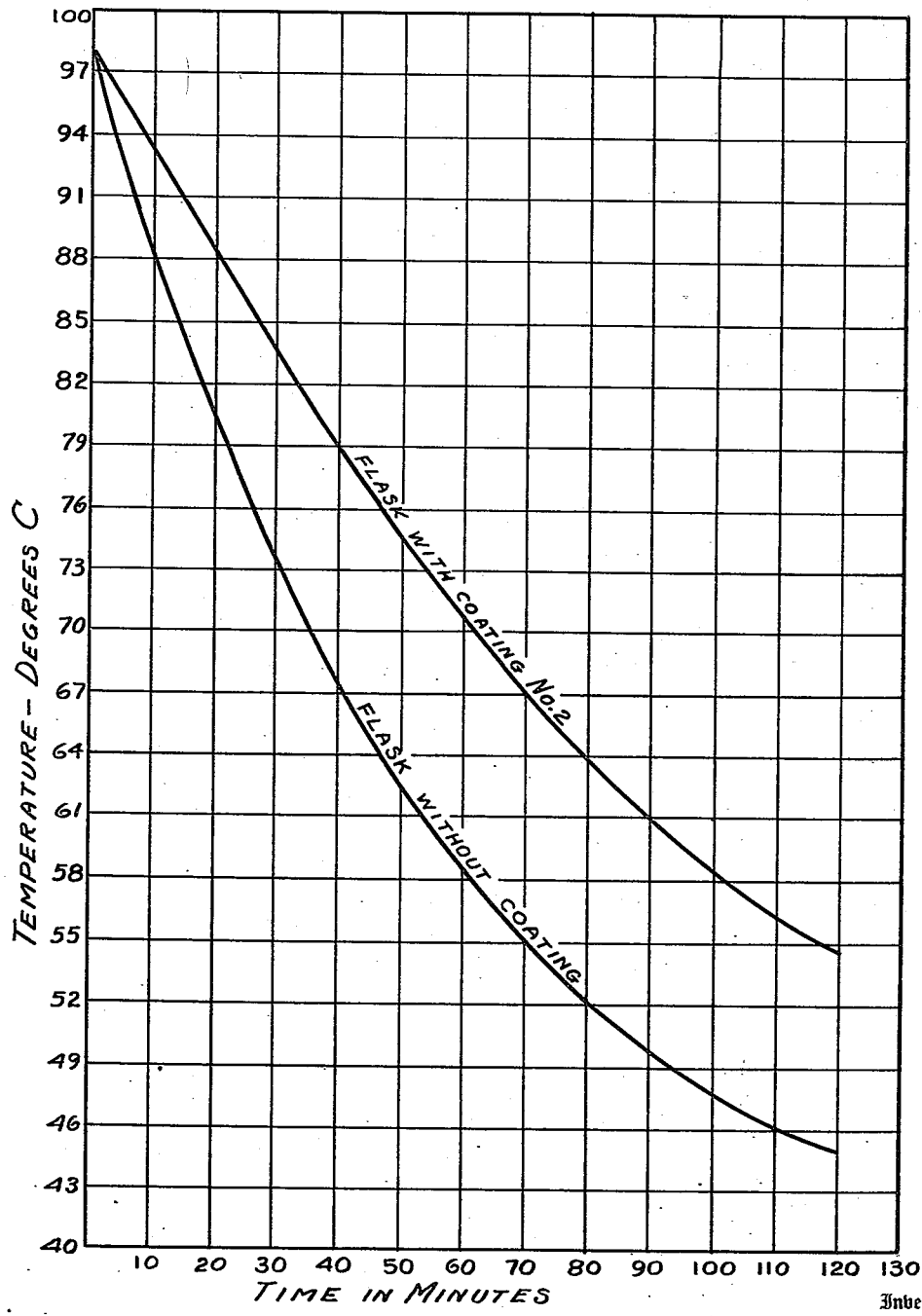
Fig. 2 is a graph with cooling curves showing the free cooling rate of an Erlenmeyer flask filled with boiling water as compared with the cooling rate of a similar flask coated on its exterior with an oxide coating produced by composition No. 2 in accordance with the invention.

With reference to Fig. 1, it will be seen that solar radiant energy is practically limited to wave lengths shorter than about 2 microns which are substantially completely transmitted by the coating and by the glass per se. The coating is substantially opaque to longer wave lengths and the glass is substantially opaque to wave lengths greater than 3.5 microns. On the other hand, the coating has very little reflectance for wave lengths shorter than about 2 microns but has a high reflectance for longer wave lengths, while the glass per se has practically no reflectance for either the short or the long infrared radiations. Although the reflectance curves are not shown beyond about 5 microns, they would be substantially unchanged in percentage of reflectance if they were extended beyond 5 microns. The latter wavelength is the point of maximum energy in the radiations emitted by a black body at 300° C. and a source at 100° C. has a maximum emission at about 8 microns. Visible radiations comprise that region of the spectrum having wave lengths from about .4 micron to .70 micron.

Coated glass articles made in accordance with my invention as set forth above may be used as heat screens for various purposes. Windows for greenhouses, homes, public buildings, vehicles, skylights, etc., having oxide coatings in accordance with my invention as shown in Fig. 3, admit the heat of direct solar radiations to which they are substantially transparent but reflect the low temperature radiation from the heated interior of the building or vehicle and prevent its escape. Such windows are particularly effective in winter.

For agricultural use, hot frames, cold frames, hot caps, etc., as shown in Fig. 4, for the growth and protection of seedlings transmit solar heat during the day but reflect the low temperature radiation from the earth during the night.

Heat screens according to the invention may also be employed for culinary purposes, laboratory apparatus, etc., for example, coffee makers, boiling flasks, Dewar flasks, covers for casseroles, skillets and the like, oven door windows, etc. and when coated with oxide coatings in accordance with the invention they reflect low temperature radiation coming from the interior of the vessel or oven and substantially retard their rates of cooling.

The term "metal oxide film," as used in the claims, means a film consisting of one or more metal oxides deposited on a glass surface by contact of such surface, while heated to a temperature of about 500° C. or above, with an atmosphere containing a hydrolyzable salt or salts of the corresponding metal or metals, such as an atomized solution of such salt or salts.

I claim:

1. A heat screen composed of a clear, transparent glass sheet having on a surface thereof a continuous metal oxide film about 1000 to 7000 Angstroms thick integrally united directly with the glass surface but not intermingled with the glass, said film having a composition different from that of the glass and consisting essentially of a composition selected from the group consisting of an oxide of tin, an oxide of indium, cadmium oxide, an oxide of tin plus an oxide of antimony, an oxide of tin plus an oxide of indium, an oxide of indium plus cadmium oxide, a mixture of an oxide of tin and an oxide of antimony containing up to 20% of an oxide of a metal selected from the group consisting of copper, zinc, vanadium, chromium, manganese, and cobalt, and a mixture of an oxide of tin and an oxide of indium containing up to 20% of an oxide of a metal selected from the group consisting of copper, zinc, vanadium, chromium, manganese, and cobalt, said film having been deposited on such surface by contact of such sheet while heated to a temperature between about 500° C. and the softening point of the glass with an atmosphere containing a hydrolyzable salt or salts corresponding to the respective metal oxide composition, and said film being clear and transparent to visible radiations but substantially reflective to infrared radiations longer than two microns.

2. A heat screen composed of a clear, transparent glass sheet having on a surface thereof a continuous metal oxide film about 1000 to 7000 Angstroms thick integrally united directly with the glass surface but not intermingled with the glass, said film having a composition different from that of the glass and consisting essentially of stannic oxide, said film having been deposited on such surface by contact of such sheet while heated to a temperature between about 500° C. and the softening point of the glass with an atmosphere containing a hydrolyzable tin salt, and said film being clear and transparent to visible radiations but substantially reflective to infrared radiations longer than two microns.

3. A heat screen composed of a clear, transparent glass sheet having on a surface thereof a continuous metal oxide film about 1000 to 7000 Angstroms thick integrally united directly with the glass surface but not intermingled with the glass, said film having a composition different from that of the glass and consisting essentially of stannic oxide and an oxide of antimony, said film having been deposited on such surface by contact of such sheet while heated to a temperature between about 500° C. and the softening point of the glass with an atmosphere containing a hydrolyzable tin salt and a hydrolyzable antimony salt, and said film being clear and transparent to visible radiations but substantially reflective to infrared radiations longer than two microns.

4. A heat screen according to claim 3, in which the film contains about 1.5% of an oxide of antimony computed as $Sb_2O_3$.

5. A heat screen composed of a clear, transparent glass sheet having on a surface thereof a continuous metal oxide film about 1000 to 7000 Angstroms thick integrally united directly with the glass surface but not intermingled with the glass, said film having a composition different from that of the glass and consisting essentially of a mixture of stannic oxide and an oxide of antimony containing up to 20% of an oxide of a metal selected from the group consisting of copper, zinc, vanadium, chromium, manganese, and cobalt, said film having been deposited on such surface by contact of such sheet while heated to a temperature between about 500° C. and the softening point of the glass with an atmosphere containing hydrolyzable salts corresponding to the respective metal oxide mixture, and said film being clear and transparent to visible radiations but substantially reflective to infrared radiations longer than two microns.

6. A heat screen according to claim 5, in which the film contains up to 20% of zinc oxide.

7. A heat screen composed of a clear, transparent glass sheet having on a surface thereof a continuous metal oxide film about 1000 to 7000 Angstroms thick integrally united directly with the glass surface but not intermingled with the glass, said film having a composition different from that of the glass and consisting essentially of 93.2% of stannic oxide, 5.5% of an oxide of antimony computed as $Sb_2O_3$, and 1.3% of zinc oxide, said film having been deposited on such surface by contact of such sheet while heated to a temperature between about 500° C. and the softening point of the glass with an atmosphere containing hydrolyzable salts corresponding to such metal oxide composition, and said film being clear and transparent to visible radiations but substantially reflective to infrared radiations longer than two microns.

8. A heat screen composed of a clear, transparent glass sheet having on a surface thereof a continuous metal oxide film about 1000 to 7000 Angstroms thick integrally united directly with the glass surface but not intermingled with the glass, said film having a composition different from that of the glass and consisting essentially of cadmium oxide, said film having been deposited on such surface by contact of such sheet while heated to a temperature between about 500° C. and the softening point of the glass with an atmosphere containing a hydrolyzable cadmium salt, and said film being clear and transparent to visible radiations but substantially reflective to infrared radiations longer than two microns.

9. A heat screen composed of a clear, transparent glass sheet having on a surface thereof a continuous metal oxide film about 1000 to 7000 Angstroms thick integrally united directly with the glass surface but not intermingled with the glass, said film having a composition different from that of the glass and consisting essentially of an oxide of indium and cadmium oxide, said film having been deposited on such surface by contact of such sheet while heated to a temperature between about 500° C. and the softening point of the glass with an atmosphere containing a hydrolyzable indium salt and a hydolyzable cadmium salt, and said film being clear and transparent to visible radiations but substantially reflective to infrared radiations longer than two microns.

JOHN M. MOCHEL.

REFERENCES CITED

The following references are of record in the file of this patent:

UNITED STATES PATENTS

| Number | Name | Date |
| --- | --- | --- |
| 1,385,162 | Tillyer | July 19, 1921 |
| 1,425,967 | Hoffman | Aug. 15, 1922 |
| 1,698,302 | Goss | Jan. 8, 1929 |
| 1,737,686 | Rising | Dec. 3, 1929 |
| 1,957,279 | Linke | May 1, 1934 |
| 2,042,117 | Murray | May 26, 1936 |
| 2,130,215 | Young | Sept. 13, 1938 |
| 2,144,943 | Sharp et al. | Jan. 24, 1939 |
| 2,252,495 | Dusing | Aug. 12, 1941 |
| 2,304,754 | Wainer | Dec. 8, 1942 |
| 2,366,516 | Geffcken et al. | Jan. 2, 1945 |
| 2,396,585 | Long | Mar. 12, 1946 |
| 2,475,379 | Stong | July 5, 1949 |
| 2,482,054 | Colbert et al. | Sept. 13, 1949 |
| 2,519,545 | Colbert et al. | Aug. 22, 1950 |